Figure 1:
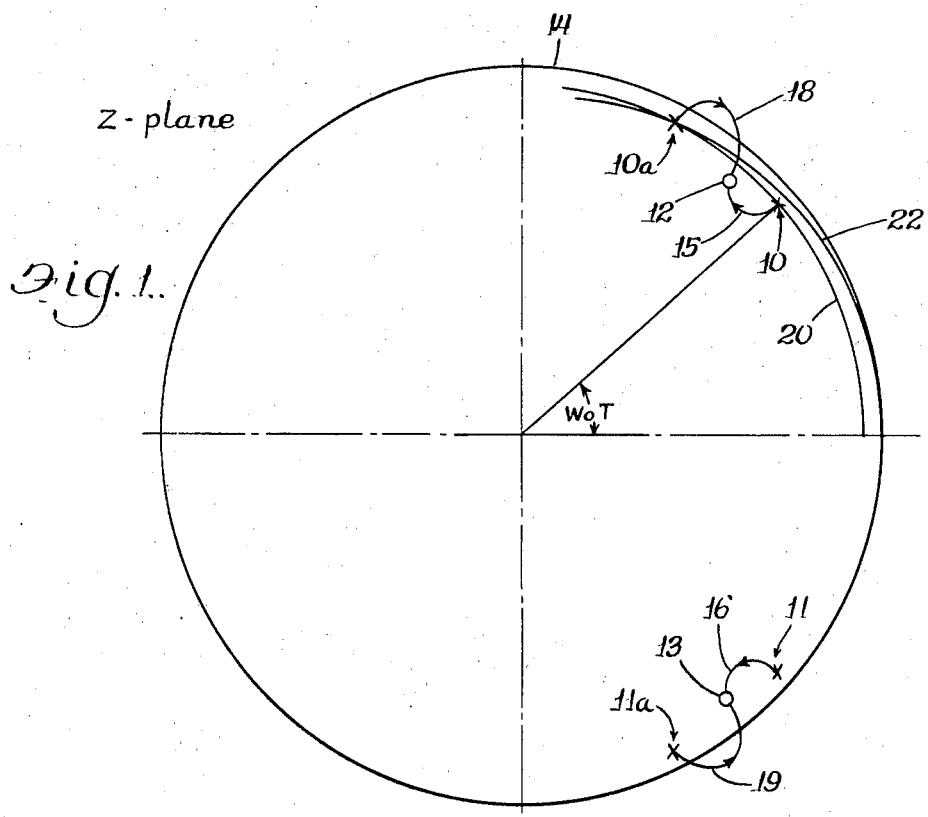

United States Patent

[11] 3,572,618

[72] Inventor Richard M. Willett
 Ames, Iowa
[21] Appl. No. 679,850
[22] Filed Nov. 1, 1967
[45] Patented Mar. 30, 1971
[73] Assignee Iowa State University Research
 Foundation, Inc.
 Ames, Iowa

[54] METHOD FOR STABILIZING AIRCRAFT AND MISSILES
 3 Claims, 2 Drawing Figs.
[52] U.S. Cl. .................................... 244/77,
 235/150.1, 318/20.550
[51] Int. Cl. ..................................... B64c 13/18
[50] Field of Search .......................... 235/150.1;
 318/20.550; 244/76, 77

[56] References Cited
 UNITED STATES PATENTS
3,215,374 11/1965 Olshausen ............... 244/77
3,279,725 10/1966 Andrew et al. ........... 244/77

Primary Examiner—Milton Buchler
Assistant Examiner—Jeffrey L. Forman
Attorney—Dawson, Tilton, Fallon and Lungmus ABSTRACT: stability of a sampled-data feedback control system for an airframe is enhanced by varying the sampling interval as a function of the particular bending mode the airframe exhibits. A command signal is fed to the control system for controlling the state of the airframe; and sensed signals are generated by transducers on the airframe representative of the actual state of the airframe. The difference between the command signal and the sensed signals is sampled thereby generating a train of error pulses. The train of error pulses is then fed into a digital controller for computing digital signals for controlling the airframe according to its characteristics. A signal is generated for identifying the instantaneous body bending mode frequency; and the sampling interval of the error signal is varied inversely with respect to the instantaneous body bending frequency to maintain the product of the mode frequency and sampling interval a constant.

Patented March 30, 1971  3,572,618

Inventor:
Richard M. Willett
By:
Dawson, Tilton, Fallon & Lungmus
Attys.

METHOD FOR STABILIZING AIRCRAFT AND MISSILES

BACKGROUND

Modern aircraft and missiles operate over an extremely wide range of conditions; and their dynamical operation and response characteristics vary greatly. Hence, although a control system may be stable for low speeds and low altitudes, it may become unstable at high speeds or high altitudes.

As air frames are designed for higher speeds and higher altitudes, the effect of the various modes of body bending (as distinguished from the rigid body motion of the airframe) has become a very important factor effecting the stability of the control system. Not only velocity and altitude, but also fuel and age may cause changes in the body bending frequency. Hence, a control system must maintain its stability under conditions of unpredictable and very rapid changes in the instantaneous frequency of body bending.

Heretofore, stability has been sought by control systems in which the gain of the various feedback loops is changed in response to signals generated by a computer. The computer determines altitude and velocity; and then it adjusts the control system gains to predetermined values corresponding to supposed optimum characteristics. This is essentially an open loop type of operation. In other words, if the predetermined gains are incorrect and the system should become unstable, there is no feedback mechanism for correcting the system parameters to achieve stability.

In very large space vehicles or boosters, the air frame cannot be considered a rigid body. Bending of the body about the transverse axes can be sensed by rate gyroscopes. The signal generated by the gyroscopes is fed to the control system along with the rigid body motion information of the vehicle, and it can result in an instability at the natural frequency of the structure. Furthermore, as already mentioned, the frequency and amplitude of the body bending varies with flight conditions and flight time. That is, the mass fuel of the vehicle changes during flight; and the natural frequency and damping of resonant modes change correspondingly.

Some of these more sophisticated problems are sought to be solved by the use of adaptive control techniques which differ from ordinary open loop control in that adjustments are made on the basis of the performance of the system itself as it is operating, and not on the basis of measurements of external phenomena such as altitude and velocity.

In one commercial system, a controller is designed such that there are a total of three more poles than zeros in the overall open loop transfer function of the control system. Compensation is designed so that for some very high gain, all but two of the poles are well into the left-half of the complex plane; and two complex poles approach the imaginery axis at a frequency well above that of the air frame response. Thus, the response of the system is extremely rapid so that the input signals must be filtered to prevent excessive g-force buildup to prevent damage to the structure. To insure that the gain is held at a sufficiently high level without allowing the two complex poles to cross into the right-half of the complex plane (which indicates instability), a gain changing device is used. A band-pass filter tuned to the natural frequency of the complex pole detects the buildup of oscillations. When the amplitude exceeds certain value, the gain is reduced. If no oscillation appears, the gain is gradually increased. The result is a continuous, small oscillation in the system gain, and a small limit cycle in the system output at the frequency of the complex pole.

A second commercial system, similar to the one previously described, prevents the two complex poles from ever reaching the imaginery axis. The sensing for gain setting is accomplished by noting the presence of signals in the output at the natural frequency of the complex poles. As the gain is varied, the frequency as well as the damping of this pair of poles changes. The system gain is changed to maintain these poles at the same frequency and therefore at approximately the same position in the s-plane. The closed loop system then has effectively the same characteristics as the previously described system except that there is no low amplitude oscillation or limit cycle in the output of this system.

Neither of these last two systems described are satisfactory for controlling missiles and aircraft when body bending cannot be ignored. The reason for this is that the transfer function describing the pitch response of a flexible missile to control surface deflection exhibits poles which are very close to the imaginery axis; hence, a high gain system will drive these poles into the right-half plane and thus become unstable unless the location of these poles is controlled.

In sensing the particular mode of oscillation, the amount of body bending sensed by a gyroscope depends upon the position of the gyroscope with respect to the node. Obviously, the gyroscope may be placed at one position corresponding to a maximum deflection of one polarity at which there will be relatively large body bending signals present, or it may be placed at the node at which there is little signal present, or it may be placed at a location sensing signals which are 180° out of phase with the first position. This becomes a problem in identifying the particular mode or process in which the structural system is responding. The problem is further complicated because the node for the second mode shifts during flight; and even if it were stationary, its position cannot be accurately predicted. Hence, attempts to eliminate the first bending mode by placing a gyroscope at the correct location are not practicable.

One proposed method for overcoming this problem is the so-called "gyro-blender" technique which effectively reduces the bending mode signal by using two gyroscopes. One is placed well ahead of the node and one well behind it. The output signals of the two gyroscopes are added, and their gains adjusted. Since the two bending signals are 180° out of phase, they are effectively cancelled. As the node position changes, a filter and detector sense the presence of the bending mode frequency in the blended signal, and adjust the gains to drive this unwanted signal to zero. A similar effect can be obtained using a band rejection filter wherein the parameters of the filter are varied so that the rejection band will track the bending mode frequency.

SUMMARY

In its theoretical aspect, the present invention contemplates maintaining control system stability by moving the pole associated with the first bending mode as the instantaneous frequency of this bending mode changes to a new location relative to the compensation zero so that the root locus of the pole in the Z-plane always remains within the unit circle which, as is commonly known, defines the limits of system stability. In particular, the changing of position of these poles is effected by changing the sampling rate such that the product of the instantaneous frequency of oscillation of the first bending mode and the sampling interval remains constant.

Thus, by simply varying the sampling rate in response to a signal representative of the actual body bending frequency, stability of the control system is maintained without the need for varying gain, etc. Further, the response of the inventive system is almost instantaneous and it is able to adapt very rapidly to any particular body bending frequency that may occur as the fuel, velocity or altitude of the vehicle change.

Other features and advantages of the instant invention will be obvious to persons skilled in the art from the following detailed description of a preferred embodiment accompanied by the attached drawing.

THE DRAWING

Figure 2:
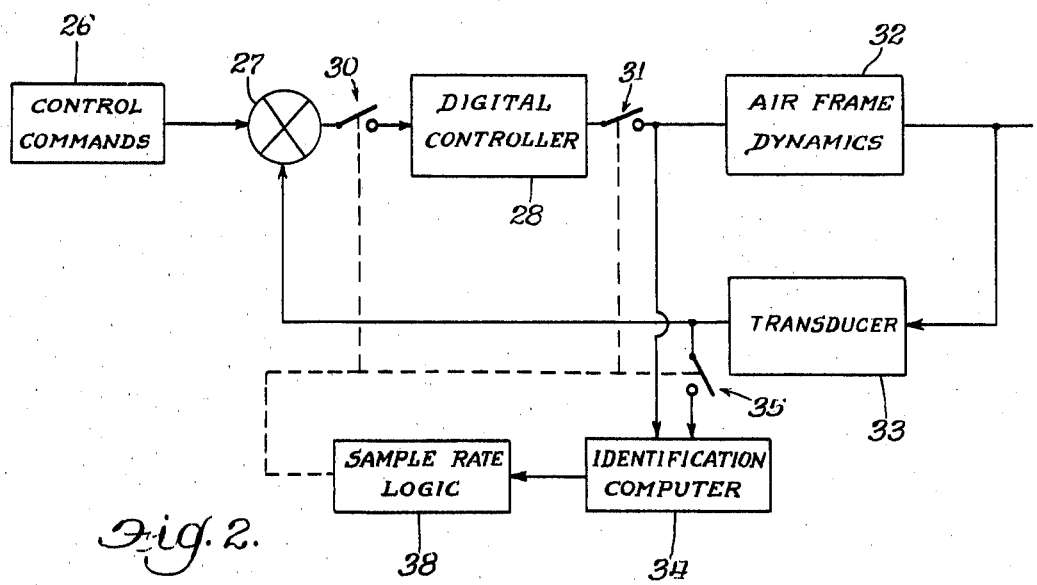

FIG. 1 is a Z-plane plot illustrating the theoretical aspects of the present invention; and FIG. 2 is a functional block diagram of a digital control system with varying sampling rate according to the present invention.

THEORY

To facilitate understanding of the present control system, reference is made to FIG. 1 which is a Z-plane plot of bending the bending mode poles sought to be controlled. As is conventional, the poles are indicated by crosses, and the zeros by circles. A pair of complex poles representative of the first bending mode poles are identified by reference numerals 10 and 11 respectively. Compensation zeros 12 and 13 are added to the system in a conventional manner, as will be explained in more detail within. In FIG. 1, the poles and zeros representative of other bending modes as well as rigid body dynamics, etc. were eliminated for clarity of illustration. With the system in this condition and stable, a root locus plot would indicate that the poles would never move outside the unit circle which is identified by reference numeral 14. The respective loci for this condition are identified by reference numerals 15 and 16.

Let it be assumed that due to a change in mass, dynamic pressure, etc., the poles of the first bending modes 10 and 11 move respectively to positions indicated at 10a and 11a. The compensation zeros remain fixed since they are independent of the bending mode oscillation. For this condition, the root locus will have a very different shape as illustrated by the curved lines 18 and 19. It will be observed that the new locus falls outside the unit circle, and the system will therefore become unstable for system gains which are either not very high or very low. In most practical systems, the gain setting is determined by other factors such as error specifications or rigid body stability. If the gain must be set to meet these other requirements, the bending mode oscillation cannot be kept stable by gain adjustment. The method most frequently suggested in prior attempts is to change the location of the compensation zeros such that the root locus again falls within the unit circle. The present invention, on the other hand, contemplates changing the position of the new pole location (10a and 11a) to bring them approximately back to their previous stable locations (namely, 10 and 11).

The pole positions in the Z-plane are given by the zeros of the expression: $Z^2 - 2Ze^{-\alpha T} \cos \omega_0 T + e^{-2\alpha T}$ (1.)
where $\omega_0$ and $\alpha$ are defined in the time function $e^{-\alpha t} \sin \omega_0 t$, and $T$ is the sampling period of the sampled data system. The zeros of this polynomial are $Z = e^{-\alpha T}[\cos \omega_0 T \pm j \sin \omega_0 T] = e^{-\alpha T_e + j\omega_0 T}$ (2.) If $\alpha$ (the damping coefficient) is small, which is the case for a lightly damped characteristic such as will describe the body bending modes, and if $\omega_0$ (the angular velocity of the body bending mode) is relatively large, then changes in $T$ will result in motion of the body bending mode pole on a path which is nearly a circle with its center at the origin of the Z-plane. In this case then, motion of the body bending poles from positions 10 and 11 to 10a and 11a in FIG. 1 can be compensated for by reducing $T$ by the appropriate amount.

Another way of illustrating this compensation scheme is that it will be observed from equation (2) that any change in the instantaneous frequency of body bending (i.e. $\omega_0$) will result in a locus of the poles 10 and 11 which defines a circle having its center at the origin of the Z-plane. For the pole 10, this circular path is designated by reference numeral 20. That is to say, as the frequency of the body bending oscillation increases, the pole 10 will move to the location 10a along the circular arc 20. This can easily be observed from equation (2) since the parameter $\omega_0$ is present only in the imaginery term. But it will be observed that the sampling interval $T$ also appears in the imaginery part of the expression of equation (2). Hence, if the product of $\omega_0 T$ can be held constant, then there will be no net change in the angular displacement of the pole in the Z-plane.

Of course, the factor of the sampling interval also appears in the real part of the expression of equation (2); and hence, the net damping factor will also be effected as the sampling interval is changed. However, as pointed out above, the damping coefficient for the first body bending mode is small so that there is a negligible overall change in the effective damping coefficient (which comprises both $\alpha$ and $T$). The locus of the pole 10 as $T$ varies will define a spiral, indicated by reference numeral 22 in FIG. 1.

In summary, the theoretical aspect of the present invention might be described by saying that the compensation scheme contemplated will vary the sampling interval $T$ such that the product $\omega_n T$ remains constant. In other words, in terms of FIG. 1, as the pole 10 moves along the circular arc 20 to position 10a (in response to an increase in the frequency of body bending) the present control system will reduce the sampling interval to, in effect, move the pole location from the position 10a back along the spiral trajectory 22 to a location approximating location 10 but slightly outward thereof (yet within the unit circle). This is further illustrated in FIG. 1 by indicating that the angle $\omega_n T$ remains constant. It will be further observed that this is accomplished while maintaining the zeros 12 and 13 of the compensator fixed.

This change in $T$ will also change the positions of the rigid body poles and the other bending mode poles. In the case of the rigid body poles, $\omega_0$ will be small enough so that the change in position will not be troublesome. In the case of the poles corresponding to the second and third bending modes, their characteristics are such that they can usually be kept stable over a fairly wide range of $T$.

SYSTEM DIAGRAM

Referring now to FIG. 2, the block labeled CONTROL COMMANDS identified by reference numeral 26 generates an analogue signal for controlling the state of the air frame, for example, by controlling the angle of attack, the pitch position or rate, the yaw angle or rate or acceleration, etc. The command signal is fed to a summing junction 27; and the resultant error signal is fed to a digital controller 28. The input signal to the digital controller 28 is a sampled-data input, and this is schematically illustrated in the drawing by the controlled switch 30. The output of the digital controller 28 is fed through a sampling switch 31 to control the air frame dynamics 32.

The air frame dynamics 32 is sensed by means of a transducer 33, the output of which is fed to the other input of the summing junction 27.

An identification computer receives the input signal to the air frame dynamics 32 and the output signal of the transducer 33 through a sampling switch 35. The identification computer is denoted by reference numeral 34.

A block labeled SAMPLE RATE LOGIC 38 receives the output signal of the identification computer 34 and controls the sampling interval of the switches 30, 31 and 35 in unison.

OPERATION

In operation, the transducer 33 might be a gyroscope or rate gyroscope depending upon the particular parameter sought to be controlled, and it generates an electrical signal representative of the actual or instantaneous value of the system parameter sought to be controlled. Thus, it may generate an electrical signal representative of displacement, or pitch angle, or pitch angle rate. The output signal of the transducer 33 and the analogue command signal are summed at the summing junction 27; and the resultant signal is sampled by the switch 30. Thus, the input to the digital controller 28 is a train of electrical pulses representative of the error between a desired value for a control parameter and the actual or observed value for that parameter.

The digital controller 28 is a device (usually a fixed program in an onboard digital computer) for implementing or solving the difference equations which define the compensation poles and zeros in the z-plane. As mentioned above, the zeros 12 and 13 in FIG. 1 are such compensation zero. Apparatus and techniques for implementing this function are well known to persons skilled in the art; and they need not be explained in further detail for purposes of understanding the present invention. However, it will be observed that the positions of the compensation zeros in the Z-plane are independent of the body bending motion and the sampling rate.

Thus, the output signal of the digital controller 28 is also a train of pulses (or impulses) which are fed to the various servos and hydraulic actuators controlling the air frame.

The identification computer 34 has the function of defining the actual or instantaneous body bending frequency; and its output signal is thus representative of the actual body bending frequency. As illustrated in the block diagram, the identification computer receives both the input signal to the air frame and the output or measured signal from the air frame and it seeks to define the open loop transfer characteristic of the system for fixing the poles of the first bending mode (the poles 10 and 11 of FIG. 1). There are also many well-known and conventional techniques for identifying the particular process or mode in which the air frame is responding. One such technique is described in my dissertation which was submitted to The Graduate Faculty of The Iowa State University of Science and Technology at Ames, Iowa in Partial Fulfillment of The Requirements for the Degree of Doctor of Philosophy entitled SAMPLED-DATA ADAPTIVE CONTROL UTILIZING VARIABLE SAMPLING RATES.

In general, process identification encompasses the determination of the position of the poles in the Z-plane (or in the s-plane). In the case of sampled-data systems, this is not a difficult theoretical problem; and the method described in the above-identified Thesis is referred to as the method of least squares. Another well-known method was described by G. G. Lendaries in a paper presented at the AIEE Winter General Meeting at New York, in Feb., 1961 entitled ON THE IDENTIFICATION OF LINEAR SYSTEMS.

Thus, as the identification computer 34 generates a signal representative of an increase in the frequency of body bending, the sample rate logic 38 will correspondingly decrease the sampling interval. Conversely, if the identification computer indicates that the instantaneous frequency of body bending motion decreases, the sampling rate will correspondingly increased. Preferably, the product of $\omega_n T$ should remain constant. The sample rate logic 38 may be a simple voltage-controlled oscillator with suitable pulse-shaping circuitry for controlling the sampling operation of the switches 30, 31 and 35 since a voltage-controlled oscillator increases its output frequency as a function of increasing amplitude of its input voltage. This would decrease the sampling interval correspondingly.

In summary, the acceptable sampling rate according to the inventive process is one which displaces the pole corresponding to a particular body bending frequency, in an angular direction relative to the origin of the Z-plane opposite to the angular direction in which the pole had been displaced responsive to a change in the mode of body bending. In effect, instead of tracking the pole position with the compensation zero as suggested by prior systems, the changes in sampling rate force the pole to stay in a desirable stable location with respect to the compensation zero. The roots of the compensation transfer function do not change position in the Z-plane when the sampling rate is changed; but the poles characteristic of the air frame dynamics do change —in the case of the body bending poles, they can be displaced in a favorable direction.

Having thus described in detail a preferred process for stabilizing the control system for an air frame which exhibits body bending, it will be obvious to persons skilled in the art that certain modifications or substitutions may be made for those steps which have been described; and it is, therefore, intended that all such equivalents be covered as they are embraced within the spirit and scope of the appended claims.

I claim:

1. A method for controlling an air frame having input command signal for controlling the state of said air frame and output sensed signals representative of the actual state of said air frame, comprising: sampling the difference between desired command and sensed output signals thereby generating a train of pulses representative of the error between the same; generating from said error signal a train of pulses for controlling said air frame in a predetermined manner; generating an identification signal representative of an instantaneous body bending mode frequency of said air frame; and varying the sampling interval of said error signal inversely with respect to the instantaneous body bending frequency whereby as the instantaneous frequency of said body bending increases the sampling interval decreases to maintain system stability.

2. The method of claim 1 characterized by the fact that the product of the sampling interval and instantaneous body bending frequency remain constant.

3. In a sampled-data feedback control system for controlling the dynamics of an air frame, the improvement comprising: means sensing the condition of a state of said air frame for generating a signal representative thereof; and means receiving said state signal for varying the sampling interval of said system as an inverse function of the instantaneous frequency of oscillation determined by said sensing means.